Jan. 22, 1952     N. P. GREEN ET AL     2,583,171
DRIFT ELIMINATOR

Filed Feb. 17, 1950     3 Sheets-Sheet 3

Nathaniel P. Green,
Peter A. Barrett,
Eugene L. Bass,
Inventors,
Haynes and Koenig,
Attorneys.

Patented Jan. 22, 1952

2,583,171

UNITED STATES PATENT OFFICE 2,583,171

DRIFT ELIMINATOR

Nathaniel P. Green, University City, and Peter A. Barrett, Kirkwood, Mo., and Eugene L. Bass, Tulsa, Okla., assignors, by direct and mesne assignments, to Water Cooling Equipment Co., St. Louis County, Mo., a corporation of Missouri Application February 17, 1950, Serial No. 144,814

6 Claims. (Cl. 183—75)

This invention relates to drift eliminators for eliminating entrained droplets of liquid from a generally upward flow of gas, and more particularly to drift eliminators such as are used in mechanical draft water cooling towers for removing water entrained in air as it flows upward through the tower.

This invention has for its purpose the provision of a drift eliminator particularly for use in a vertical air flow water cooling tower to remove water entrained in air flowing upward through the tower which, while having lower resistance to flow of air per unit of area, is adapted effectively to remove entrained water thereby substantially to eliminate drift loss. With the drift eliminator constructed so as to have low resistance to flow of air, and yet effective to remove entrained water, it is feasible to operate at relatively high air velocities and thereby obtain increased capacity in a tower installation of a given size. For example, by replacing an existing drift eliminator in an existing cooling tower with a drift eliminator of this invention, it is possible substantially to increase the air capacity of the tower without requiring installation of a larger fan and motor.

Among the several features of the drift eliminator of this invention whereby resistance to flow of air is considerably reduced without sacrificing its drift-eliminating capacity is the construction of the eliminator with two eliminator racks or panels, each of which comprises a plurality of blades arranged side-by-side in generally parallel, spaced-apart array. The planes of the blades of the first of the two panels are inclined in one direction with respect to the horizontal for changing the direction of the flow as it passes through the spaces between the blades from generally upward to a flow inclined in said one direction. The planes of the blades of the second panel are oppositely inclined. The second panel is positioned with its blades extending generally parallel to those of the first panel and spaced above the latter to such an extent with relation to the inclination of the blades of the first panel as to permit at least the heavier of the entrained droplets of water to follow a free gravity-induced trajectory in the space between the blades of the panels after passing through the first panel for elimination of such droplets. The remaining droplets are substantially eliminated by being flung outward against the blades of the second panel by centrifugal action as the air again changes direction in passing through the spaces between the blades of the second panel. Another feature of the invention resides in having both panels inclined with respect to the horizontal in the direction of the length of the blades so that water collecting on the blades, instead of collecting in drops and falling directly downward back into the air stream, flows along the blades in the direction of their length toward the lower ends of the blades and runs off from one end of the eliminator at such a rate and in such quantity as to minimize any tendency again to be entrained by the air stream. Other features will be in part apparent and in part pointed out hereinafter.

The invention accordingly comprises the elements and combinations of elements, features of construction, and arrangements of parts which will be exemplified in the structures hereinafter described, and the scope of the application of which will be indicated in the following claims.

In the accompanying drawings, in which one of various possible embodiments of the invention is illustrated, Fig. 1 is a transverse vertical section through a water cooling tower having drift eliminators of this invention installed therein, taken substantially on line 1—1 of Fig. 2;

Similar reference characters indicate corresponding parts throughout the several views of the drawings.

Figure 1:
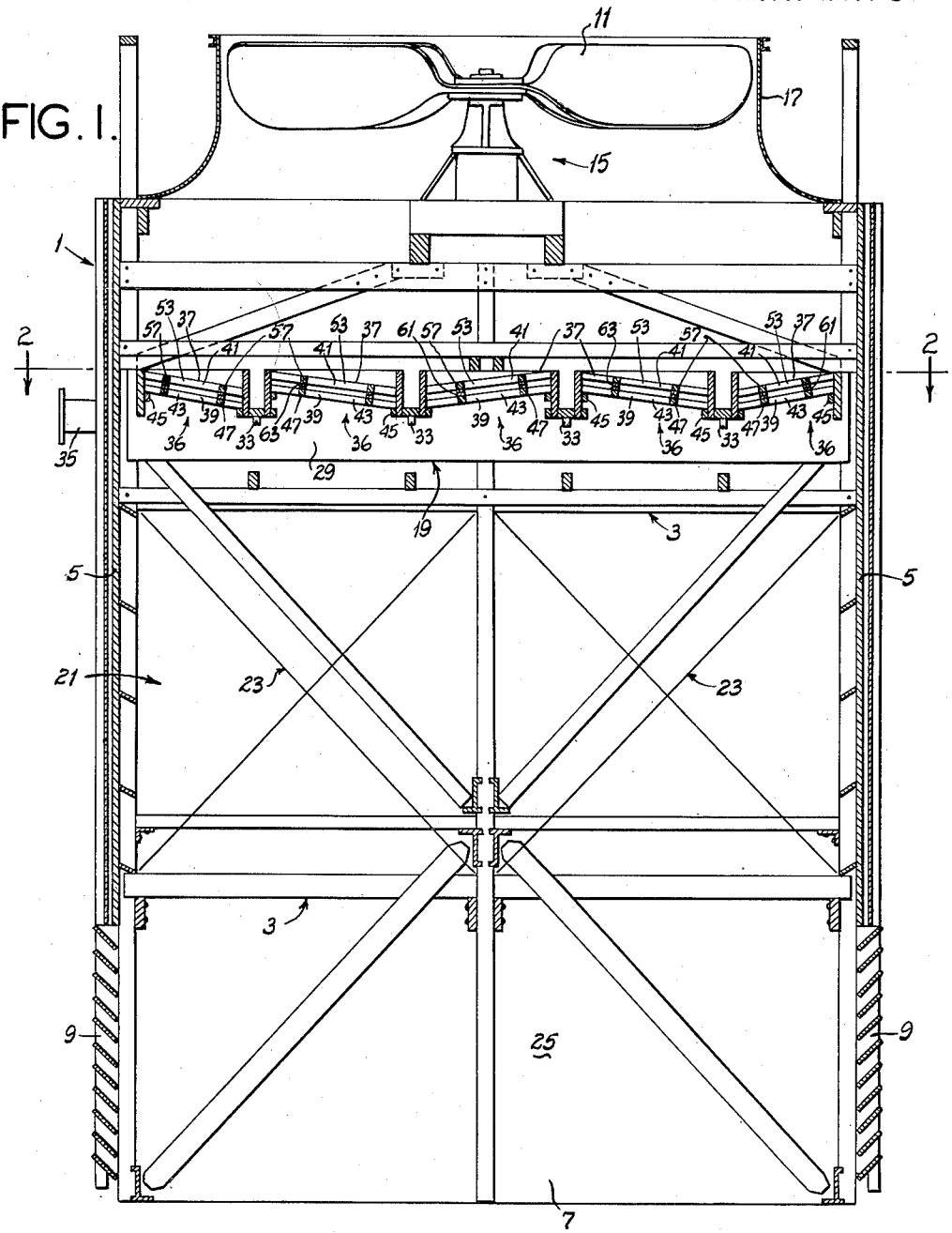
Figure 2:
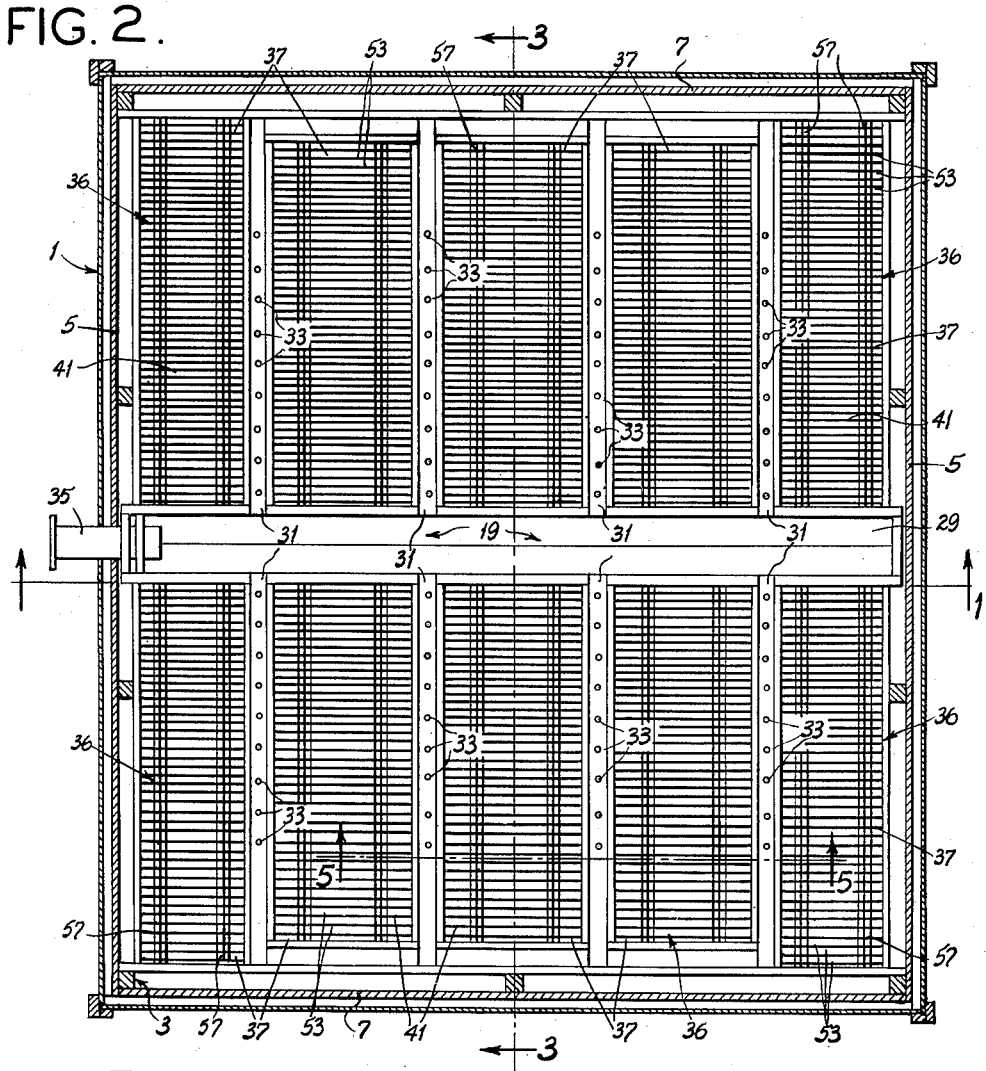
Fig. 2 is a horizontal section taken substantially on line 2—2 of Fig. 1.
Figure 5:
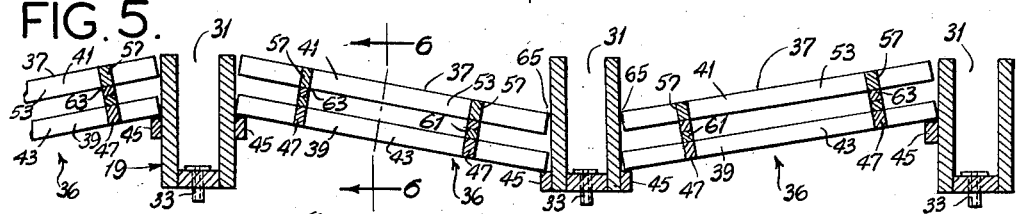
Fig. 5 is an enlarged vertical section taken substantially on line 5—5 of Fig. 2.

Referring to the drawings, a typical water cooling tower of the induced draft, vertical air flow type, in which drift eliminators of this invention are particularly suitable, is generally designated 1. As shown, the tower is rectangular in horizontal cross section, and comprises a structural framework, generally designated 3, and exterior vertical side walls 5 and end walls 7 enclosing the framework. The end walls 7 completely close the ends of the tower from top to bottom. The side walls 5 terminate short of the bottom of the tower, and below the side walls at both sides of the tower are louvered air inlet openings 9.

At the top of the tower is a fan 11 which rotates in a horizontal plane to draw air through the inlets 9 and induce an upward draft through the tower. The fan is driven by a motor 13 through a transmission 15. A Venturi-type fan ring 17 mounted on the top of the tower surrounds the fan. Below the fan is a water distribution system, generally designated 19, for distributing water which is to be cooled to fall in streams distributed over the horizontal cross-sectional area of the tower.

Below the water distribution system is a cooling chamber or filling section 21 provided with a filling indicated generally by crosses 23 for breaking up the streams of water falling from the distribution system. The water drips through the filling, which is of such open-work construction as to present large areas of wetted surface with minimum resistance to flow of air therethrough, for efficient heat exchange between the water and air flowing upward through the tower. The filling may consist of an arrangement of wooden slats acting as baffles for the water dripping downward through the filling so arranged that any streams of water are broken up by the slats without imposing any considerable obstruction to flow of air. Such filling arrangements and others of suitable character are well known in the art, and, inasmuch as no one particular type filling is essential to this invention, further description of the filling is omitted.

The filling 23 extends down to a level above the top of the air inlets 9, the interior of the tower being open below the filling and thereby providing an open air inlet chamber 25 at the bottom of the tower. The tower is built over a catch basin 27 which receives cooled water dripping down from the filling.

The water distribution system 19 comprises a main trough 29 extending from one side wall 5 to the other and smaller lateral troughs 31 extending from opposite sides of the main trough to the end walls 7 of the tower. The lateral troughs 31 have water outlet openings 33 in their bottoms spaced at intervals along their lengths. At 35 is shown a water inlet supplying water to be cooled to the main trough 29. Water is supplied to the lateral troughs from main trough and streams down through the openings 33 in the lateral troughs upon the filling 23.

The main and lateral troughs and the side and end walls of the tower divide the horizontal cross-sectional area of the tower at the level of the water distribution system into a plurality of rectangular openings 36. In each of these openings is a drift eliminator of this invention, generally designated 37, the arrangement being such that moisture-laden air flowing upward from the filling section 21 must travel through a drift eliminator before leaving the tower.

Figure 3:
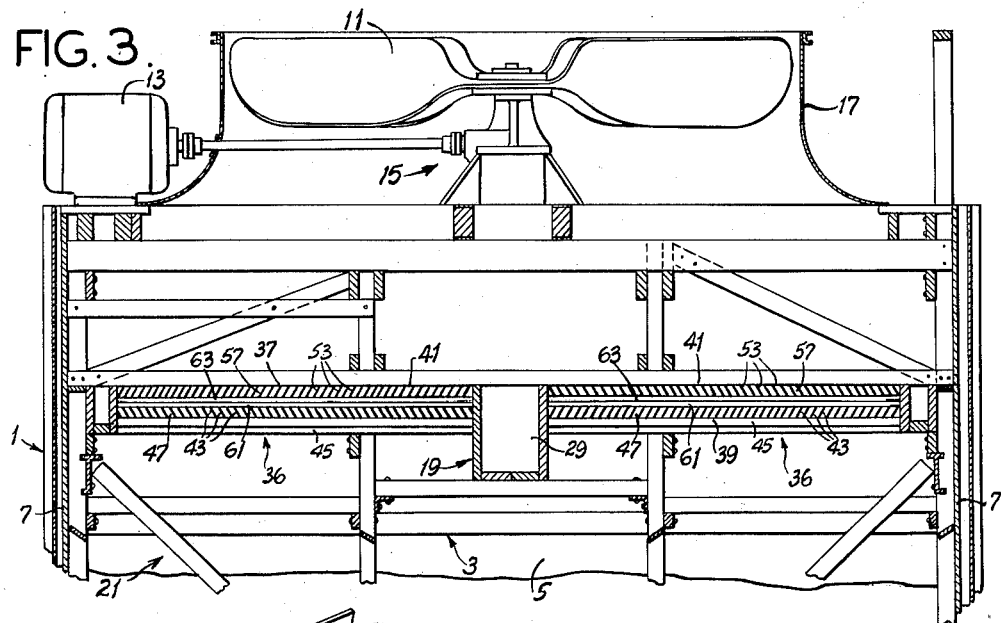
Fig. 3 is a fragmentary longitudinal transverse section through the upper part of the tower, taken substantially on line 3—3 of Fig. 2.

Each of the drift eliminators 37 consists of two, and only two eliminator racks or panels, the lower or first of these panels being generally designated 39, and the upper or second being generally designated 41. Each lower panel 39 comprises a plurality of flat wooden blades 43 arranged side-by-side in generally parallel, spaced-apart array, with the planes of the blades inclined in one direction with respect to the horizontal. As shown in Fig. 3, this direction is inclined upward and toward the left for those panels 39 on the left of the main trough 29, and inclined upward and toward the right for those panels 39 on the right of the main trough. The blades are close enough to one another that the direction of flow of the air stream is changed as it passes through the spaces between the blades of the lower panels from vertically upward to a flow inclined in the direction of the inclination of the planes of the blades.

As shown, the blades 43 of the lower panels 39 are of such length that they may fit between the sides of adjacent lateral troughs 31 or between the tower side walls 5 and the adjacent lateral troughs, with the panels inclined in the direction of the length of the blades. The length of the panels transverse to the length of the blades corresponds to the distance from the main trough 29 to the tower end walls 7. The ends of the blades are supported by members 45 secured to the sides of the lateral troughs and the sides of the tower.

Figure 4:
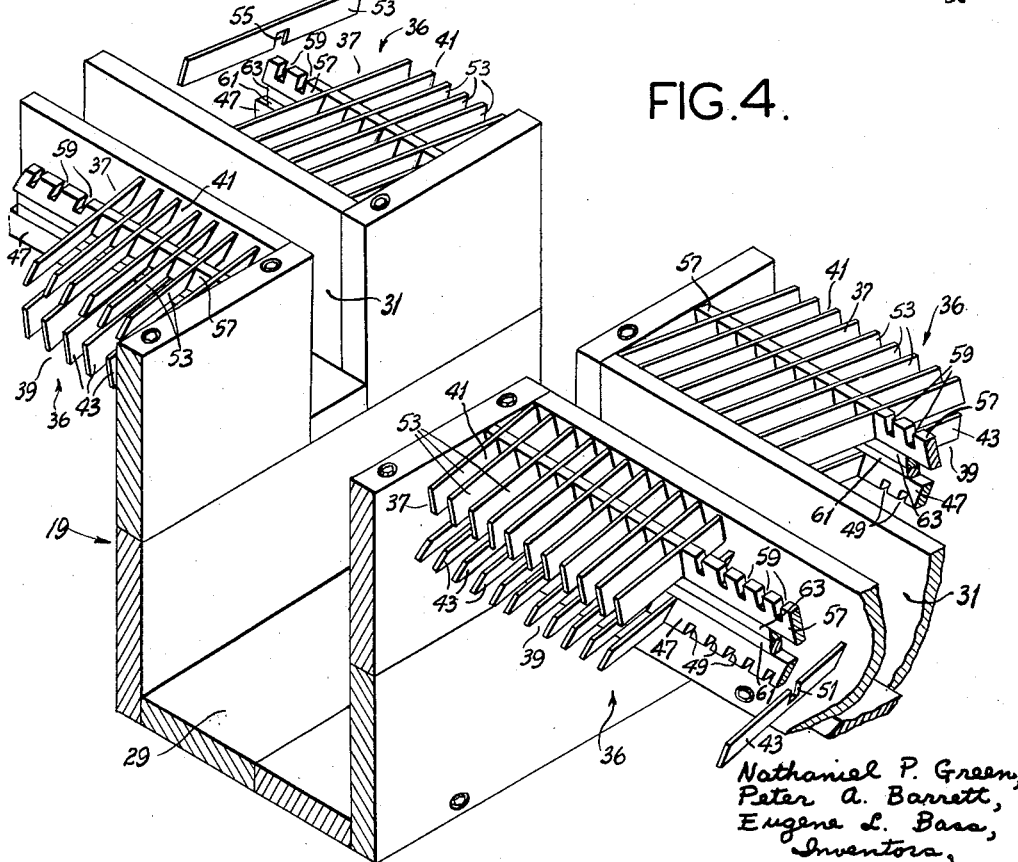
Fig. 4 is a fragmentary isometric view illustrating details of the drift eliminators of the invention.

The blades are maintained in their generally parallel, spaced-apart angled array by wood spacer members 47 extending transverse to the blades. Each spacer 47 as shown best in Fig. 4, consists simply of a wooden member of rectangular cross section having a series of notches 49 cut in its lower edge at the angle and with the spacing corresponding to the desired inclination and spacing of the blades 43. Notches 51 are cut in the upper edges of the blades 43 to form notched joints with the notched spacers, and the blades and spacers are held in assembled relation by the notched joints without any necessity for the use of nails or other fasteners.

Each upper panel 41 is made like the lower panels and comprises a plurality of flat wooden blades 53 arranged side-by-side in generally parallel, spaced-apart array, with the planes of the blades inclined oppositely with respect to the inclination of the blades of the respective lower panel. As shown in Fig. 3, the blades 53 of those upper panels on the left of the main trough 29 are inclined upward and toward the right, and the blades 53 of those upper panels on the right of the main trough are inclined upward and toward the left. It will be seen that these inclinations are the opposite of those of the blades of the respective lower panels 39. The blades 53 are close enough to one another that air flowing out from between the blades of the lower panels in one inclined direction is angled by the blades of the upper panels to flow in an oppositely inclined direction. For example, air flowing through a drift eliminator to the left of the main trough 29 as viewed in Fig. 3 is first angled by the blades of the lower panel of the eliminator to flow in a direction inclined upwardly and to the left, and is then angled by the blades of the upper panel of the eliminator to flow in a direction inclined upward and to the right, and then again changes direction, reverting to generally vertically upward flow.

The blades 53 of the upper panels correspond in length to the blades 43 of the lower panels. They are preferably made of the same size lumber as the blades 43 and have notches 55 cut in their lower edges to form notched joints with upper panel blade spacing members 57 like spacing members 47 having notches 59 cut in their upper edges. Notches 59 are cut at the angle and with the spacing corresponding to the desired inclination and spacing of the blades 53, this spacing preferably being the same as that of the lower blades 43 and the inclination being the same as to angle but opposite in direction to that of the lower blades 43.

Each upper panel 41 is mounted in a position in the direction of the length of its blades generally parallel to and spaced above the respective lower panel by means of spacers 61 and 63. Spacers 61 engage the upper edges of the blade spacing members 47 of the lower panel. Spacers 63 rest on the upper edges of spacers 61, and the blade spacing members 57 of the upper panel rest on the spacers 63. The upper panels need not be nailed or otherwise fastened to the lower panels as they are prevented from sliding off the lower panels by engagement of their lower sides with the sides of the lateral troughs, as indicated at 65.

Figure 6:
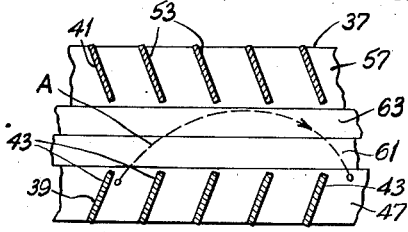
Fig. 6 is an enlarged vertical section taken on line 6—6 of Fig. 5.

Spacers 61 and 63 are of such thickness that the upper panel 41 is spaced above the lower panel to such an extent with relation to the inclination and width of the blades 43 of the lower panel as to permit at least the heavier droplets of water entrained in the air to follow a free gravity-induced trajectory in the space between the panels after passing through the spaces between the blades 43. This is illustrated in Fig. 6, the dotted arrow A indicating the trajectory of a heavy droplet of water in the space between panels. This trajectory is usually parabolic, being due to the overcoming of the upward component of the force of the air stream on a droplet by gravity, and the horizontal component of force applied by the air stream flowing at an inclination to the vertical between the blades of the lower panel. The spacing of the panels to provide adequate unobstructed space for the heavier droplets to travel in such a trajectory depends upon such factors as the inclination of the blades and the speed of the air stream, being a direct function of both these factors, but, in general, the spacing should approximate the vertical projection of the width of the lower blades, i. e., the thickness of a panel (see Fig. 3).

In the operation of the tower, water to be cooled is supplied through the inlet 35 to the main trough 29. Water enters the lateral troughs 31 from the main trough and streams out through openings 33 upon the filling 23. The streams are broken up by the filling and the water splashes and trickles down through the filling so that it is effectively cooled by the upward draft of air through the filling induced by the fan 11. Cooled water dripping from the filling is collected in the catch basin 27. As the air flows upward through the filling it entrains droplets of water. Some of these are of relatively large mean diameter, for example, one-sixteenth to one-eighth of an inch, and relatively heavy; the remainder are considerably smaller and lighter, constituting a finely divided mist. The air with such droplets of water entrained therein flows vertically upward from the filling through the drift eliminators 37.

As the air travels through the spaces between the blades 43 of the lower eliminator panels, its direction of flow is changed from vertically upward to an inclined direction corresponding to the inclination of the planes of the blades. The force of the air stream on the heavier droplets is sufficient to cause most of such droplets issuing from between the lower blades 43 to start off on a gravity-induced trajectory in the space between the lower and upper panels and ultimately fall back upon a lower blade 43. The trajectory is usually generally parabolic, its curve being determined by the forces imposed on the droplet by the air stream and by gravity. Such droplets falling back on the lower blades 43 run off downward on the inclined blades toward the lower ends of the latter. The blades are inclined in the direction of their length to such an extent that the rate of run-off is sufficiently high substantially to prevent formation on the blades of drops which are large enough to break the surface tension and fall free before reaching the lower ends of the blades. Thus, most of the water accumulating on the lower blades runs down to the lower ends of the blades before falling back into the tower. This is an important advantage because, if the blades were not inclined in the direction of their length, droplets on the blade surfaces would accumulate and form drops on the bottom edges of the blades, these drops increasing in size until their weight breaks the surface tension and they either fall back into the tower or are picked up again by the air stream. Where the velocity of the air stream is high, the tendency of the stream to pick up these drops is increased, and, as a result, there would be an increase in drift loss unless the blades are inclined in the direction of their length. Another advantage of having the blades inclined in the direction of their length to prevent formation of large drops on the lower edges of the blades, is that if such drops accumulate, they decrease the free area between blades for flow of air and thereby increase the air velocity and pressure drop through the eliminator. By inclining the blades in the direction of their lengths to avoid formation of large drops on the lower edges of the blades, the pressure drop or resistance to flow of air through the drift eliminator is reduced.

The finer droplets, and any heavy ones which may elude the elimination by the lower eliminator panel, are carried by the air stream into the upper eliminator panel 41. In entering the spaces between the blades 53 of the upper panel, the direction of flow is sharply changed and the droplets entrained in the air, being heavier than air, are thrown against the upper blades 53 by centrifugal action, thus completing the elimination of entrained water. Here again, droplets picked up by the upper blades flow down the length of the blades to their lower ends in the same manner and with the same advantages as described above in conjunction with the lower blades.

In the above-described drift eliminator of this invention, the air changes direction only three times in flowing through the eliminator, viz., in entering the lower panel, in entering the upper panel, and in leaving the upper panel. This is in contrast to prior drift eliminator constructions wherein the arrangement is such as to force the air to change direction more than three times, in order to insure centrifugal slinging of droplets on to the blades of the eliminator. By reducing the number of changes of direction of flow, the resistance to flow of the eliminator of this invention is substantially reduced and its capacity substantially increased. This is in addition to the reduction in resistance to air flow brought about by inclining the panels in the direction of the length of the blades. Despite the reduction of the number of changes of direction of air flow, the eliminator of this invention is effective to eliminate drift because of the provision of adequate space between the panels to allow the heavier droplets to fly off in a trajectory aimed to make them fall back upon the lower blades, remaining droplets being eliminated by the upper panel. In addition, since only two panels of blades are required, there is a considerable saving in lumber and fabrication costs. As a matter of fact, the lumber in an existing drift eliminator installation of an old type can be made over into an eliminator of this invention with the result not only of increasing the capacity of the cooling tower, due to the reduction in resistance to flow of air through the eliminator, but also of obtaining a surplus of lumber which can be re-used in an additional eliminator.

In an exemplary construction, the blades of both the lower and upper eliminator panels are made of 3/8" by 1¾" lumber. The lower and upper spacers 41 and 51 are made of 1" by 2" lumber. The blades are set at an angle of about 70° to the horizontal and spaced apart about 1½ inches. The spacer strips 61 and 63 are made of 1" by 1" lumber and consequently space the lower and upper panels by about two inches in the direction perpendicular to the planes of the panels. The panels are inclined in the direction of the length of the blades with a slope of about 1:7. The angle of inclination of the planes of the blades may be varied from about 30° to somewhat less than 90° in respect to the horizontal. The slope of the panels in the direction of the lengths of the blades may range from 0° to 45° in respect to the horizontal. With 0° slope, the advantage of inclining the panels is lost, but the other advantages remain.

In view of the above, it will be seen that the several objects of the invention are achieved and other advantageous results attained.

As many changes could be made in the above constructions without departing from the scope of the invention, it is intended that all matter contained in the above description or shown in the accompanying drawings shall be interpreted as illustrative and not in a limiting sense.

We claim:

1. In a vertical air flow water cooling tower having a filling for breaking up streams of water falling in the tower and through which air flows upward, carrying with it entrained droplets of water, a drift eliminator in the tower above the filling for removing entrained droplets of water comprising two eliminator panels, one above the other, each comprising a plurality of blades the planes of which are inclined with respect to the horizontal, the blades of the lower panel being spaced apart side-by-side with their planes generally parallel and inclined with respect to the horizontal more than 30° but less than 90° for changing the direction of air flow generally to the inclined direction of the planes of the blades, the blades of the upper panel also being spaced apart side-by-side with their planes generally parallel and inclined oppositely to the blades of the lower panel for changing the direction of air flow to an oppositely inclined direction, the lower edges of the blades of the upper panel being spaced above the upper edges of the blades of the lower panel at least a distance approximating the vertical projection of the width of the blades of the lower panel, this spacing being such in relation to the inclination of the blades of the lower panel as to permit at least the heavier of the entrained droplets of water to follow a free gravity-induced trajectory in the space between the panels after passing through the lower panel for elimination of such droplets, the remaining droplets being substantially eliminated by the upper panel, said panels being inclined with respect to the horizontal in the direction of the length of the blades at an angle up to 45°.

2. A drift eliminator as set forth in claim 1 wherein the blades of the respective panels are maintained in their spaced-apart side-by-side relation by means of spacer members extending transverse to and notch-jointed with the blades.

3. A drift eliminator as set forth in claim 2 wherein the upper panel is spaced above the lower panel by means of spacers resting on the spacer members of the lower panel.

4. In a vertical air flow water cooling tower having a filling for breaking up streams of water falling in the tower and through which air flows upward, carrying with it entrained droplets of water, a drift eliminator in the tower above the filling for removing entrained droplets of water comprising two and only two eliminator panels, one above the other, each comprising a plurality of blades the planes of which are inclined with respect to the horizontal, the blades of the lower panel being spaced apart side-by-side with their planes generally parallel and inclined with respect to the horizontal at an angle of approximately 70° for changing the direction of air flow generally to the inclined direction of the planes of the blades, the blades of the upper panel also being spaced apart side-by-side with their planes generally parallel and inclined oppositely to the blades of the lower panel for changing the direction of air flow to an oppositely inclined direction, the lower edges of the blades of the upper panel being spaced above the upper edges of the blades of the lower panel a distance approximating the vertical projection of the width of the blades of the lower panel, this spacing being such in relation to the inclination of the blades of the lower panel as to permit at least the heavier of the entrained droplets of water to follow a free gravity-induced trajectory in the space between the panels after passing through the lower panel for elimination of such droplets, the remaining droplets being substantially eliminated by the upper panel, said panels being inclined with respect to the horizontal in the direction of the length of the blades with a slope of about 1:7.

5. A drift eliminator as set forth in claim 4 wherein the blades of the respective panels are maintained in their spaced-apart side-by-side relation by means of spacer members extending transverse to and notch-jointed with the blades.

6. A drift eliminator as set forth in claim 5 wherein the upper panel is spaced above the lower panel by means of spacers resting on the spacer members of the lower panel.

NATHANIEL P. GREEN.
PETER A. BARRETT.
EUGENE L. BASS.

REFERENCES CITED

The following references are of record in the file of this patent:

UNITED STATES PATENTS

| Number | Name | Date |
|---|---|---|
| 877,460 | Brunner et al. | Jan. 21, 1908 |
| 1,861,158 | Hilger | May 31, 1932 |
| 1,989,033 | Weir | Jan. 22, 1935 |
| 2,197,970 | Elmer | Apr. 23, 1940 |
| 2,330,901 | Mart | Oct. 5, 1943 |
| 2,356,192 | Yingling | Aug. 22, 1944 |